United States Patent [19]
Calvin, Sr.

[11] 3,871,844
[45] Mar. 18, 1975

[54] SCREEN APPARATUS FOR AIR INLET
[76] Inventor: Frank F. Calvin, Sr., 3792 Donaldson Dr., Chamblee, Ga. 30341
[22] Filed: Sept. 28, 1973
[21] Appl. No.: 401,898

[52] U.S. Cl. ......... 55/306, 60/39.09 P, 60/39.09 D, 244/53 B, 244/134 R, 137/15.1
[51] Int. Cl. ........................................... B01d 39/12
[58] Field of Search ............ 55/306, 463, 489, 492, 55/498, DIG. 40, DIG. 28, 267, 385; 60/39.09 P, 39.09 D; 244/53 B, 134 R; 137/15.1

[56] References Cited
UNITED STATES PATENTS

| | | | |
|---|---|---|---|
| 2,507,018 | 5/1950 | Jewett et al. | 60/39.09 D X |
| 2,598,603 | 5/1952 | Richtarsic | 55/505 |
| 2,680,345 | 6/1954 | Frost | 60/39.09 D |
| 3,121,545 | 2/1964 | Meletiou | 244/53 B |
| 3,196,598 | 7/1965 | Olson | 55/306 |
| 3,426,981 | 2/1969 | Allcock | 244/53 B X |
| 3,537,240 | 11/1970 | Weidinger et al. | 60/39.09 P X |
| 3,702,121 | 11/1972 | Millman | 137/15.1 X |

Primary Examiner—Frank W. Lutter
Assistant Examiner—David L. Lacey
Attorney, Agent, or Firm—Jones, Thomas & Askew

[57] ABSTRACT

Screen apparatus for the air inlet of a turbine engine such as an aircraft power plant or the like. The screen apparatus is particularly useful for preventing ingestion of birds into aircraft jet engines. A screen extends outwardly from the air inlet of the engine to define an exterior surface providing an oblique angle relative to the nominal path of the engine through the air. Birds or other foreign objects which strike the screen are deflected away from the screen and the air inlet by the contact with the oblique angle. A solid nosecone at the forward end of the screen provides an area of relatively high air pressure which tends to deflect objects away from straight-on impact with the screen. The apertured exterior surface of the screen apparatus has an aggregate aperture area equal to or exceeding the air inlet area of the engine to permit unimpaired engine operation.

6 Claims, 5 Drawing Figures

PATENTED MAR 18 1975

SCREEN APPARATUS FOR AIR INLET

This invention relates in general to screen apparatus and in particular to screen apparatus for use with turbine engines such as aircraft power plants and the like.

The problems caused by ingestion of foreign objects into the air inlet of jet engines has long been recognized in the art. This problem is particularly acute with jet engines used on aircraft, since such engines are operated in an environment where foreign objects cannot be removed or controlled. The engines of jet aircraft taxiing on the ground frequently ingest foreign objects such as tools and other small metal objects, while a jet aircraft in flight in susceptable to ingestion of birds.

The ingestion of almost any solid foreign object into the air inlet of a jet engine causes damage to the compressor stages, and possibly to other portions of the engine. This engine damage is immediately manifested by a partial or complete loss of available engine thrust, with consequent impairment of aircraft flying ability. The problem of bird ingestion into jet engines is particularly acute during aircraft take-off, where an aircraft may fly through a flock of birds at precisely the time when maximum available thrust is required for a safe take-off. Since many commercial and private jet-powered aircraft have only two engines, it will be appreciated that a partial loss of power in both engines, or a total loss of power in one engine, occurring during or shortly after take-off can have drastic consequences. Post-crash investigations have proved that numerous jet aircraft crashes, resulting in loss of life and extensive property damage, are directly attributable to bird ingestion which occurred during or shortly after take-off.

It has been suggested in the art to equip jet engines with an air inlet screen which will prevent the entry of birds and other foreign objects into the engine. Examples of such prior-art screens are found in U.S. Pat. Nos. 2,618,358 and 2,931,460. The proper operation of a jet engine requires a substantially unimpeded air inlet opening, however, and proposed debris screens of the prior art generally produced an unwanted reduction in the effective area of the air inlet. Other prior art debris screens, recognizing the problem of air inlet area reduction, have proposed debris screens which were selectively retractable from debris-screening relation with the air inlet. Such retractable debris screens suffer the disadvantages of requiring a complex retraction-extension mechanism located in the engine pod environment of necessarily small area, and have the additional operational disadvantage that unimpeded engine air flow for maximum engine thrust is obtained by retracting the screen during periods such as aircraft take-off, when the bird strike problem is most prevalent.

Accordingly, it is an object of the present invention to provide an improved screen apparatus for use with a jet engine.

It is another object of the present invention to provide improved screen apparatus for preventing the ingesting of foreign objects into a jet engine without adversely affecting the operation of the engine.

It is still another object of the present invention to provide screen apparatus for use with a jet engine, which deflects oncoming foreign objects into a trajectory directed away from the air inlet of the engine.

Other objects and advantages of the present invention will become more readily apparent from the following description of a disclosed embodiment, including the drawings in which.

Stated in general terms, the present invention provides a screen structure which is attached to and extends forwardly of the air inlet opening of a jet engine. The screen structure has an apertured exterior surface extending from the air inlet to a leading edge location of maximum forward spacing from the air inlet opening with the exterior surface presenting an oblique angle of contact with foreign objects. The oblique contact angle tends to deflect foreign objects away from the engine air inlet, thereby minimizing the likelihood that foreign objects will break through the screen. The screen surface preferably has a large number of airflow apertures, with the area of each aperture being too small to admit a bird or a foreign object of similar size but with the aggregate area of such openings being at least as great as the airflow area of the unscreened engine air inlet. A solid nosecone positioned at the leading edge of the screen structure creates an area of relatively high air pressure directly in front of the screen, and this area of high pressure tends to deflect foreign objects away from head-on impact with the screen. The screen apparatus of the present invention preferably has a skeletal structure for appropriate structural strength, with an apertured screen covering and supported by the skeletal structure.

Figure 1:
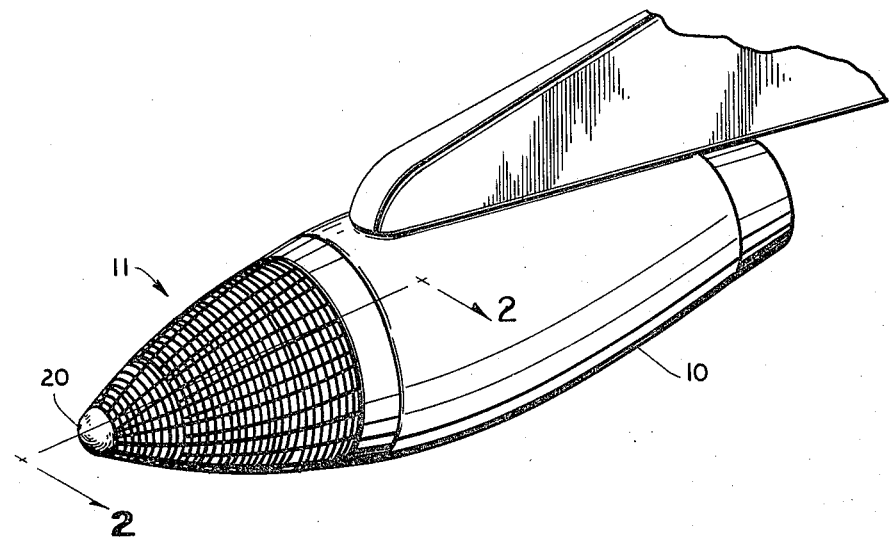
FIG. 1 shows an isometric view of an aircraft jet engine including screen apparatus according to a disclosed embodiment of the present invention.
Figure 2:
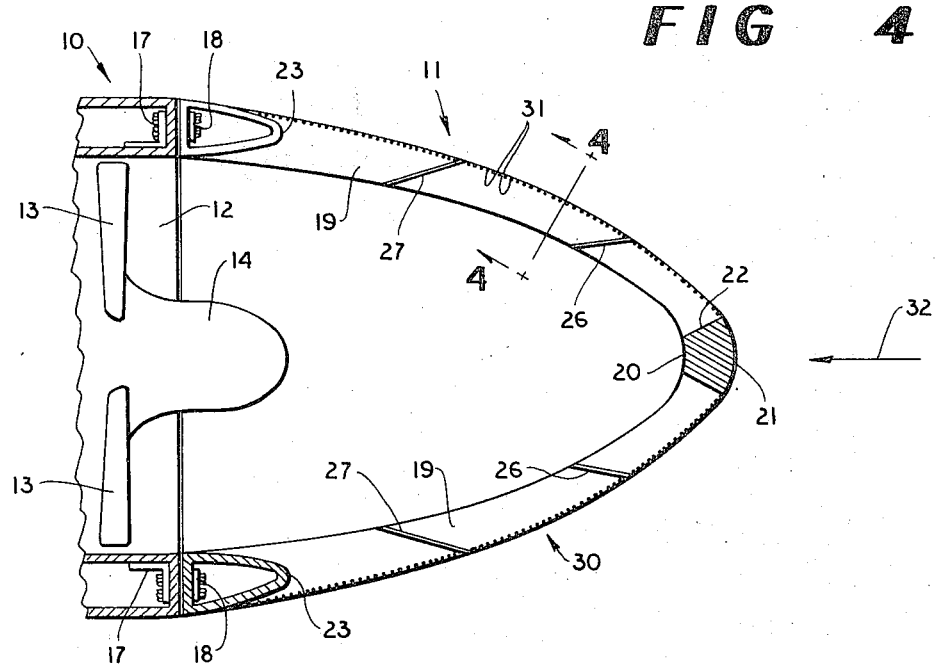
FIG. 2 is a section view taken along line 2—2 of FIG. 1.

Turning to the disclosed embodiment of screen apparatus according to the present invention, there is shown in FIG. 1 a jet engine mounted within a pod or nacelle 10 and having screen apparatus indicated generally at 11 connected to and extending outwardly from the front or air inlet portion of the engine. The construction of the screen apparatus 11 is more particularly shown in FIG. 2, where it will be understood that the jet engine mounted within the nacelle 10 has an air inlet opening 12 behind which are positioned a number of stationary air inlet guide vanes 13. A rounded fairing 14 of conventional design surrounds the longitudinal axis of the jet engine and is centrally located in the air inlet opening 12. It will be understood that the effective airflow area of the jet engine is the area determined by the diameter of the opening 12 less the area determined by the diameter of the fairing 14. This net amount of air inlet area is referred to herein as the "airflow area" of the jet engine inlet.

The engine nacelle 10 includes a frame structure 17 surrounding the air inlet opening 12, and a streamlined cowl is conventionally attached to extend outwardly of the frame 17 in jet engines which are not equipped with screen apparatus according to the present invention. The screen apparatus includes an attachment ring 18 which is secured to the frame 17 with suitable fasteners according to accepted air frame standards. It will be appreciated that the attachment ring 18 can be fabricated from two or more ring segments and need not be a single unitary structure.

Figure 3:
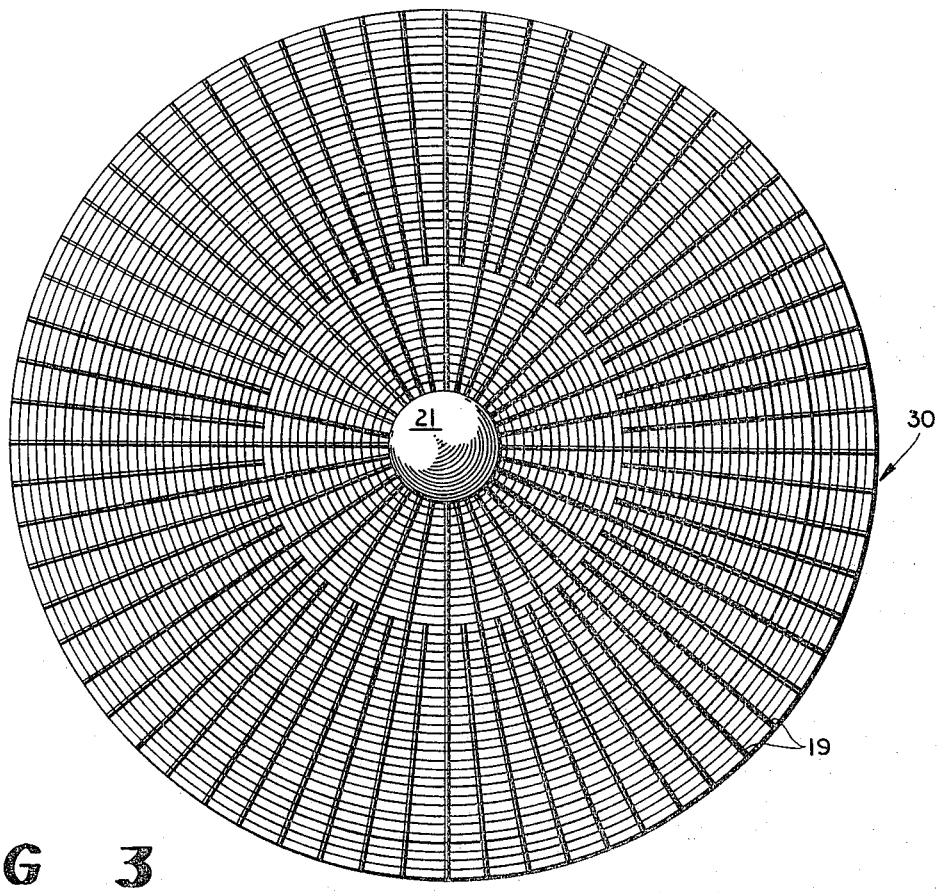
FIG. 3 is a front elevation view of the screen apparatus shown in FIG. 1.

A plurality of arcuate ribs 19 are secured to the attachment ring 18, preferably by welding; some of the ribs in the disclosed embodiment extend outwardly from the air inlet opening 12 to terminate in attachment to a nose member 20 at the leading edge of the screen member, while others of the ribs terminate short of the leading edge as shown in FIG. 3. The nose member 20 is preferably of solid structure in the shape of a truncated cone, having a blunt, rounded frontal surface 21. The conical surface 22 of the nose member 20 may have a number of grooves aligned to receive the forward ends of the several ribs 19, and the forward ends of the ribs may be welded permanently in place within these grooves. It will be understood that welded connection of the attachment ring 18, the ribs 19, and the nose member 20 results in a unitary skeletal structure of desired strength to withstand aerodynamic stresses and impacts of foreign objects, although other attachment techniques which provide the necessary structural strength may be used as an alternative to welding. The attachment ring 18, the ribs 19, and the nose cone 20 may be made from a material having suitable characteristics of structural strength and weight, such as magnesium alloy or the like. In an exemplary jet engine having an air inlet opening diameter of approximately 5 feet, for example, 32 ribs 19 can be provided extending to attachment with the nosecone 20, and an additional 32 ribs 19 can extend to terminate in attachment to the vane 26 described below; all of the ribs have equidistant annular spacing about the periphery of the air inlet opening.

The cowling normally present around the air inlet opening of a jet engine is replaced by cowl 23 extending outwardly from the attachment ring 18. The cowl 23 may also be made of a material such as magnesium alloy, and the cowl is slotted to receive the ribs 19. The cowl 23 is preferably welded to each of the ribs 19 along the slot interface between the cowl and the rib.

A pair of airflow vanes 26 and 27, each in the shape of a circular conical segment, is attached to the ribs 19 by suitable construction techniques, such as by slotting and welding to the ribs. The vanes 26 and 27 may also be made of magnesium alloy or another appropriate material. The vanes 26 and 27 have a angular alignment selected so that air passing through the apertured structure (described below) is directed generally toward the air inlet opening 12. The selection of two vanes 26 and 27 in the disclosed embodiment is by way of example only, and a greater or lesser number of such vanes can be employed if desired. It will be appreciated that the specific angular orientation of each vane 26 and 27 is determined by the spacing of the vane outwardly from the air inlet opening 12.

The several ribs 19 as rigidly interconnected with the attachment ring 18, the nose member 20, and one or more vanes, form a skeletal structure for supporting an apertured screen structure indicated generally at 30. The screen structure in the disclosed embodiment is provided by strands of stainless steel woven wire rope 31 which is looped through and around suitable apertures in the ribs 19, as shown in the detailed view of FIG. 4. The wire rope 31 in specific embodiment may be one-fourth inch diameter, with adjacent strands of the rope apaced 1.5 inches apart. The forward end of the screen structure 30 commences in contiguous relation with the blunt frontal surface 21 of the nose cone 20, and extends in a generally arcuate shape to terminate adjacent the cowl 23, approximately in perpendicular relation with the cowl. Although the screen structure 30 is depicted in the Figures as being approximately of eggshell shape, the specific external geometric configuration of the screen structure is not critical so long as the screen structure presents a generally oblique angle to the nominal direction 32 of relative movement which is generally perpendicular to the area of the air inlet opening 12, between the jet engine-screen structure and the surrounding ambient air.

Figure 4:
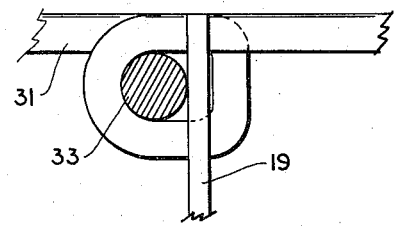
FIG. 4 is a detail section view taken along line 4—4 of FIG. 2, showing an arrangement of wire making up the periphery of the screen in the disclosed embodiment.

It is desirable to provide for heating the screen structure 31 to prevent or inhibit the formation of ice thereon, and so suitable deicing apparatus is provided such as an electrical resistive heating element 33 attached to each of the ribs 19, as shown in FIG. 4. The heating elements 33 are connected to receive power from the electrical system of the aircraft, preferably through an appropriate sensor to detect icing conditions and additionally with a manual override control in the pilot's cockpit.

The screen structure 30 is shown in the disclosed embodiment as fabricated from stainless steel wire rope, and it will be understood that the wire rope 31 may in practice be a number of rope segments and not merely a continuous length of rope wound in a spiral manner about the skeletal support structure. Although the use of stainless steel rope provides a screen structure having desirable properties of resistance to impact from foreign objects, resistance to fatigue, and other properties, it will be understood that the apertured screen structure 30 may be provided of alternative construction and material so long as the aggregate area of the apertures or openings in the screen structure is at least equal to, or greater than, the airflow area of the air inlet 12. For example, assuming a jet engine having an air inlet opening 12 of 5 feet in diameter and a fairing 14 having a frontal area of 1.00 square feet, the engine has an inlet air flow area of approximately 18.64 square feet. It can be shown that a screen apparatus constructed according to the disclosed embodiment of the present invention, for attachment onto a jet engine having the aforementioned five foot diameter air inlet opening 12, and having approximately parabolic configuration as shown in the Figures, and with 32 ribs 19 each of which is approximately 7.67 feet long and an additional 32 ribs 19 each of which is 6.25 feet long (each rib being one-eighth inch thick), has a total surface area of about 94 square feet. Depending on the dimensions of the vanes 26 and 27, the wire rope 31, and the heating elements 33, it can also be shown that the total surface area of the "obstructions," that is, the screen apparatus structure which blocks airflow, is approximately 31 square feet. Such a screen apparatus, accordingly, presents an aggregate aperture area, or airflow area, of approximately 63 square feet. Recalling the airflow area of the engine inlet, it can be seen that there is provided a screen apparatus having approximately 3.4 square feet of unobstructed airflow area for each square foot of engine inlet airflow area. In order to maintain this ratio, if desired, the length of the screen apparatus that is, the longitudinal distance from the leading edge of the nose member frontal surface 21 to the inlet 12 of the engine, should be 1.43 – 1.5 times the diameter of the engine air inlet opening 12. The foregoing ratio is not considered a limiting factor to the present invention, however, as long as the engine air inlet area is not effectively impaired by attachment of the screen apparatus on the engine and an oblique screen structure surface provides effective deflection of foreign objects.

Figure 5:
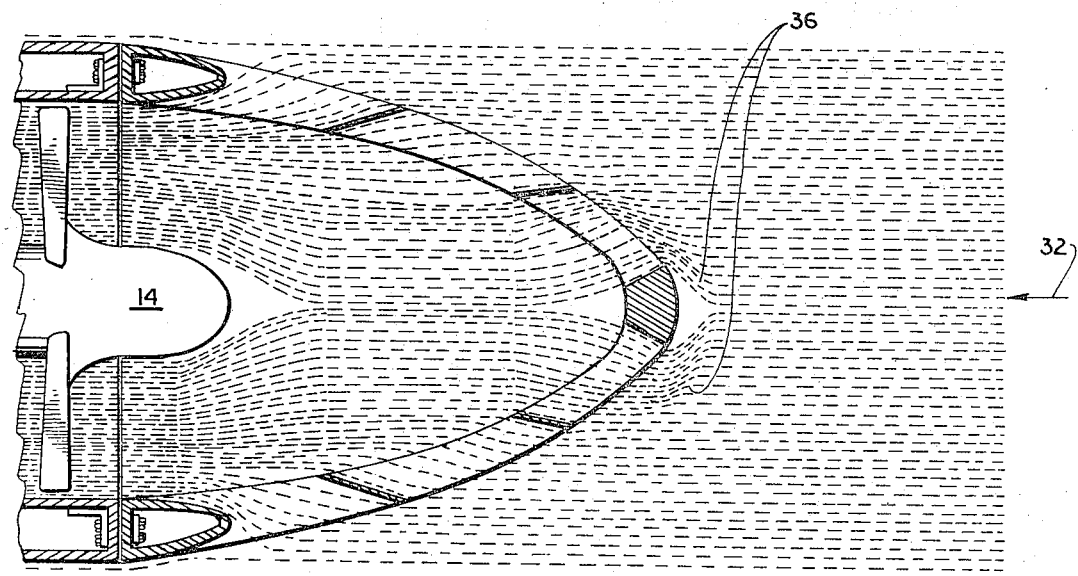
FIG. 5 is a section view showing airflow through the disclosed embodiment of screen apparatus according to the present invention.

An exemplary showing of airflow operation provided by the herein-disclosed embodiment of the present invention is set forth in FIG. 5, where it can be seen that air passing through the apertured screen structure 30 (omitted in FIG. 5 for clarity) is directed toward the air inlet opening 12 by the vanes 26 and 27. The blunt frontal surface 21 of the nose member 20 provides sufficient resistance to the oncoming air so as to create an area of relatively pressurized air immediately in front of the frontal surface. This region of pressurized air provides airflow patterns as indicated at 36, which flow around the nose member 20, and which tend to deflect birds and other foreign objects of relatively low specific gravity away from head-on impact with the screen apparatus. When the screen structure is impacted by a foreign object which has been deflected away from head-on impact, or impacts an object which is initially displaced from head-on impact, the oblique angle of the screen structure relative to the direction of movement 32 causes the foreign object to deliver a glancing blow to the screen structure and then to move away from the screen structure along a projectory which is away from the path of air passing through the apertures in the screen structure. While it is possible that the impact of a bird on the screen structure 30 will cause feathers or other external portions of the bird to be forcibly detached from the bird and drawn through the apertures for ingestion in the engine, the ingestion of feathers or the like can be tolerated with little or no loss in effective maximum engine thrust so long as the main mass of the bird body is deflected as aforementioned and is thereby prevented from entering the air inlet opening 12.

It will be further understood that the foregoing relates only to a disclosed embodiment of the present invention, and that numerous alterations and modifications may be made therein without departing from the spirit and the scope of the invention as set forth and defined in the appended claims.

What is claimed is:

1. Screen apparatus for attachment over the air inlet of a turbine engine, comprising:
   screen means connected to the engine in fixed relation surrounding the engine air inlet and extending to a forward location extending outwardly and in front of the engine air inlet, said screen means having a generally smooth exterior surface presenting an oblique angle to the direction of relative movement between the engine air inlet opening and the surrounding air;
   an imperforate arcuate frontal surface carried by said screen means at said forward location, said frontal surface having a blunt leading edge provided substantial resistance to oncoming air flow;
   said screen means comprising a plurality of structural support members connected to said turbine engine in surrounding relation to the engine air inlet and extending outwardly to terminate at said forward location, with each of said support members being spaced apart from the adjacent support members to provide respective open spaces therebetween;
   means connecting together said support members at least at one location spaced apart from said engine air inlet so that siad support members comprise a rigid skeletal support; and
   said screen means including perforate means carried by said support members in surrounding relation thereto to comprise a perforate shell covering said open spaces and presenting said oblique angle, said perforate means having airflow perforations which are individually too small to admit engine damaging articles, the total aggregate area of all of said airflow perforations being at least as great as the airflow area of the engine air inlet.

2. Apparatus as in claim 1, wherein:
   said perforate means comprises a plurality of elongate members supported by said support members and extending along the open space between adjacent support members at substantially a right angle to said direction of relative movement;
   adjacent ones of said elongate members being spaced apart from each other to provide said perforations which make up said aggregate area.

3. Apparatus as in claim 2, wherein said spaced apart elongate members are comprised of adjacent lengths of wire rope.

4. Apparatus as in claim 2, wherein:
   said means connecting together said support members comprises a nose member at said forward location and joined to each of said support members;
   said nose member having a blunt imperforate leading edge which comprises said arcuate frontal surface and which provides substantial resistance to oncoming airflow which impinges said nose member.

5. Apparatus as in claim 2, further comprising:
   airflow guide means supported within said perforate shell by said structural support members and operative to direct air flowing through said perforate shell in a direction substantially toward the engine air inlet.

6. Apparatus as in claim 2, further comprising:
   means mounted on said screen means and selectively operative to heat said screen means sufficiently to inhibit the formation of ice thereon.

* * * * *